US009476243B2

(12) United States Patent
Wuerstlein et al.

(10) Patent No.: US 9,476,243 B2
(45) Date of Patent: Oct. 25, 2016

(54) METHOD FOR CONTROLLING AN ADJUSTING MOVEMENT OF A VEHICLE CLOSING ELEMENT WITH COLLISION AVOIDANCE FOR A LOCK REGION AND ANTI-TRAP SYSTEM

(71) Applicant: Brose Fahrzeugteile GmbH & Co. Kommanditgesellschaft, Hallstadt, Hallstadt (DE)

(72) Inventors: Holger Wuerstlein, Zeil am Main (DE); Christian Herrmann, Coburg (DE); Florian Pohl, Ebersdorf (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/418,893

(22) PCT Filed: Aug. 2, 2013

(86) PCT No.: PCT/EP2013/002303
§ 371 (c)(1),
(2) Date: Jan. 30, 2015

(87) PCT Pub. No.: WO2014/019702
PCT Pub. Date: Feb. 6, 2014

(65) Prior Publication Data
US 2015/0267454 A1    Sep. 24, 2015

(30) Foreign Application Priority Data

Aug. 2, 2012 (DE) .......................... 10 2012 107 116

(51) Int. Cl.
| | |
|---|---|
| E05F 15/46 | (2015.01) |
| E05F 15/43 | (2015.01) |
| E05F 15/60 | (2015.01) |
| B60R 16/03 | (2006.01) |

(52) U.S. Cl.
CPC ............ *E05F 15/46* (2015.01); *B60R 16/0315* (2013.01); *E05F 15/60* (2015.01); *E05Y 2201/22* (2013.01); *E05Y 2800/244* (2013.01); *E05Y 2900/546* (2013.01)

(58) Field of Classification Search
CPC ......... E05F 15/46; E05F 15/43; E05F 15/73; E05F 15/611; E05C 17/203; B60R 25/2054; H03K 17/955

USPC ...................... 701/49; 16/337; 324/687, 681; 296/146.7, 146.4; 49/340; 340/657
See application file for complete search history.

(56) References Cited

U.S. PATENT DOCUMENTS

| | | | | |
|---|---|---|---|---|
| 5,448,856 A * | 9/1995 | Moore | .................. | E05F 15/611 49/28 |
| 7,855,566 B2 * | 12/2010 | Richter | ................ | H03K 17/955 324/681 |

(Continued)

FOREIGN PATENT DOCUMENTS

| | | |
|---|---|---|
| DE | 20 2004 014 760 U1 | 12/2005 |
| DE | 10 2005 038 678 A1 | 2/2007 |

(Continued)

OTHER PUBLICATIONS

English translation of the Written Opinion of the International Searching Authority, corresponding to International Application No. PCT/EP2013/002303, 4 sheets.

(Continued)

*Primary Examiner* — Yuri Kan
(74) *Attorney, Agent, or Firm* — Lewis Roca Rothgerber Christie LLP

(57) ABSTRACT

The invention relates to a method for controlling an adjusting movement of a vehicle closing element of a vehicle to be closed in a manner actuated by an external force, such as a tailgate lid, wherein an obstacle in the path of adjustment of the vehicle closing element can be detected by means of a capacitive anti-trap system in order to prevent this obstacle from being trapped, and the vehicle closing element has a locking part, via which the vehicle closing element can be locked in a closed position. An obstacle in a monitoring region around the locking part provided on the vehicle closing element can also be detected via the capacitive anti-trap system in order to prevent a collision of this locking part with an obstacle at least as the vehicle closing element closes.

14 Claims, 5 Drawing Sheets

(56) References Cited

U.S. PATENT DOCUMENTS

| | | | |
|---|---|---|---|
| 2007/0035156 A1 | 2/2007 | Compton et al. | |
| 2007/0296242 A1* | 12/2007 | Frommer | E05F 15/43 296/146.4 |
| 2009/0146827 A1* | 6/2009 | Wuerstlein | E05F 15/46 340/657 |
| 2009/0153151 A1* | 6/2009 | Cho | H03K 17/955 324/681 |
| 2010/0060489 A1 | 3/2010 | Fasshauer | |
| 2010/0256875 A1* | 10/2010 | Gehin | E05F 15/73 701/49 |
| 2011/0061200 A1* | 3/2011 | Rauscher | E05C 17/203 16/337 |
| 2012/0158253 A1* | 6/2012 | Kroemke | B60R 25/2054 701/49 |
| 2013/0207667 A1 | 8/2013 | Zibold et al. | |

FOREIGN PATENT DOCUMENTS

| | | |
|---|---|---|
| DE | 10 2006 056 240 A1 | 5/2008 |
| DE | 11 2007 001 481 B4 | 9/2011 |
| DE | 10 2010 028 718 A1 | 11/2011 |
| DE | 20 2012 005 718 U1 | 5/2013 |
| WO | WO 2006/032357 A2 | 3/2006 |
| WO | WO 2007/020058 A1 | 2/2007 |

OTHER PUBLICATIONS

Chinese Office Action for Application No. 201380041099.3, dated Dec. 15, 2015 and English translation (10 pages).
Search Report for Application No. 2013800410993, dated Dec. 4, 2015 (2 pages).
International Search Report, corresponding to PCT/EP2013/002303, dated Oct. 14, 2013, 6 pages.

* cited by examiner

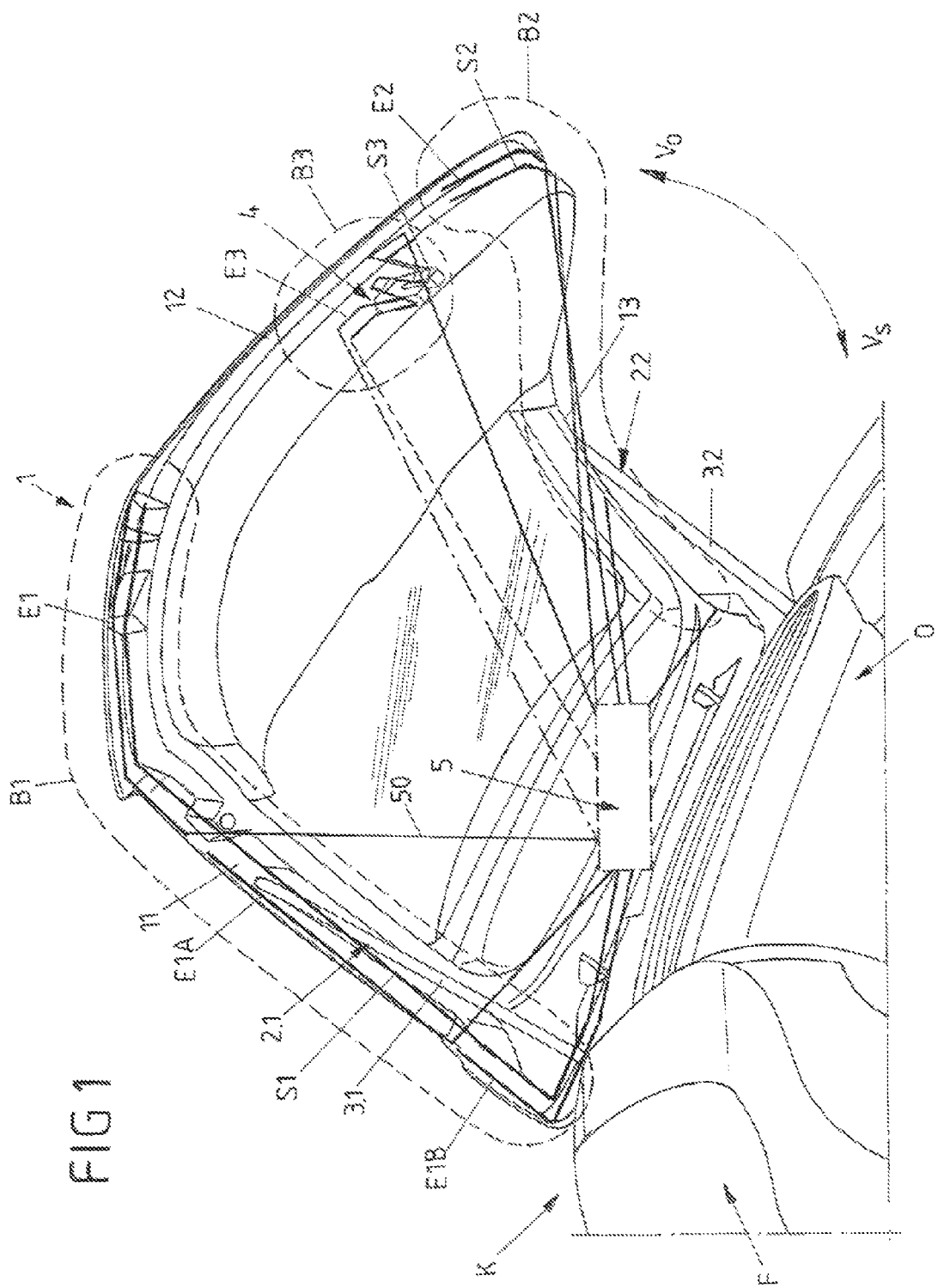

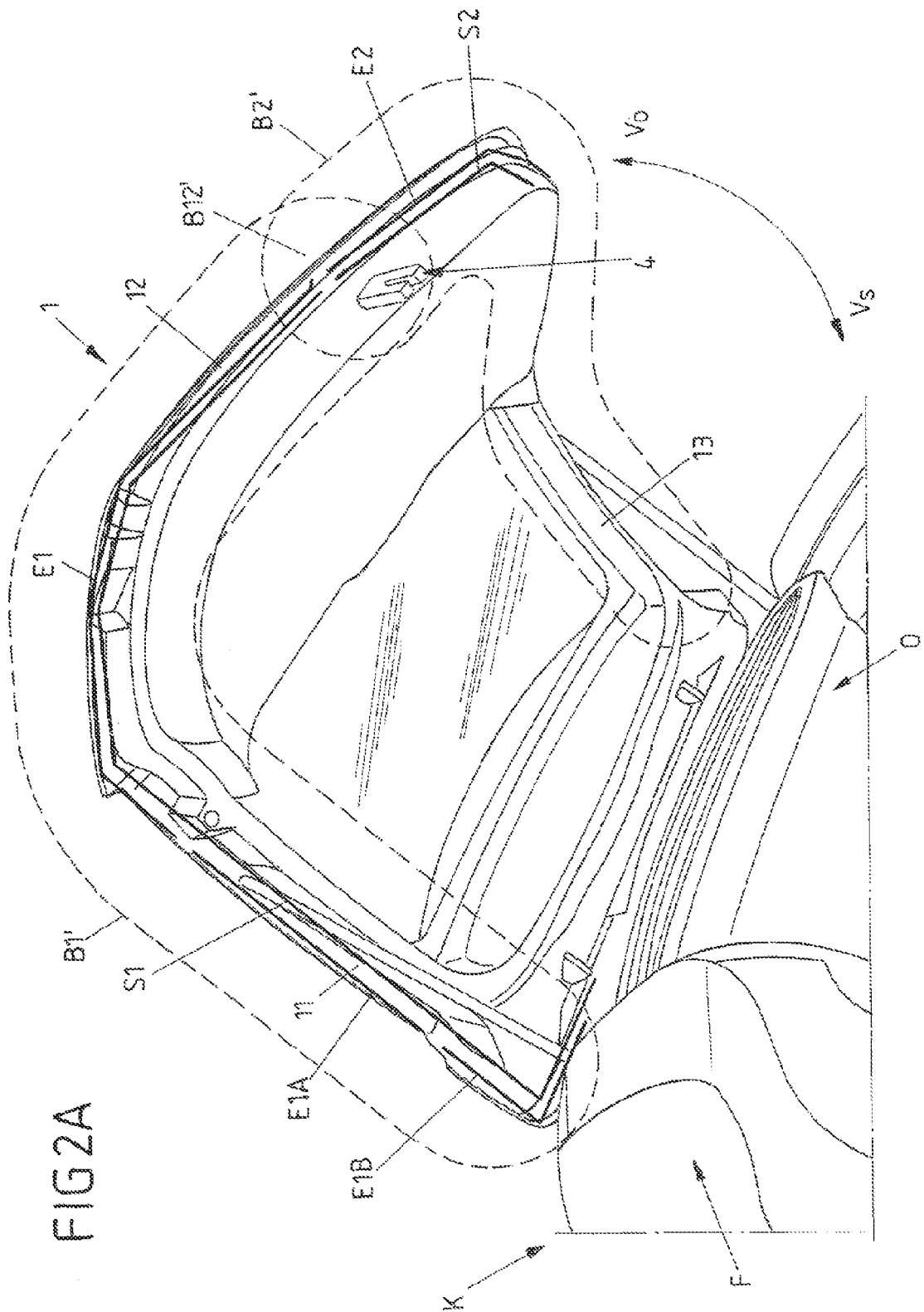

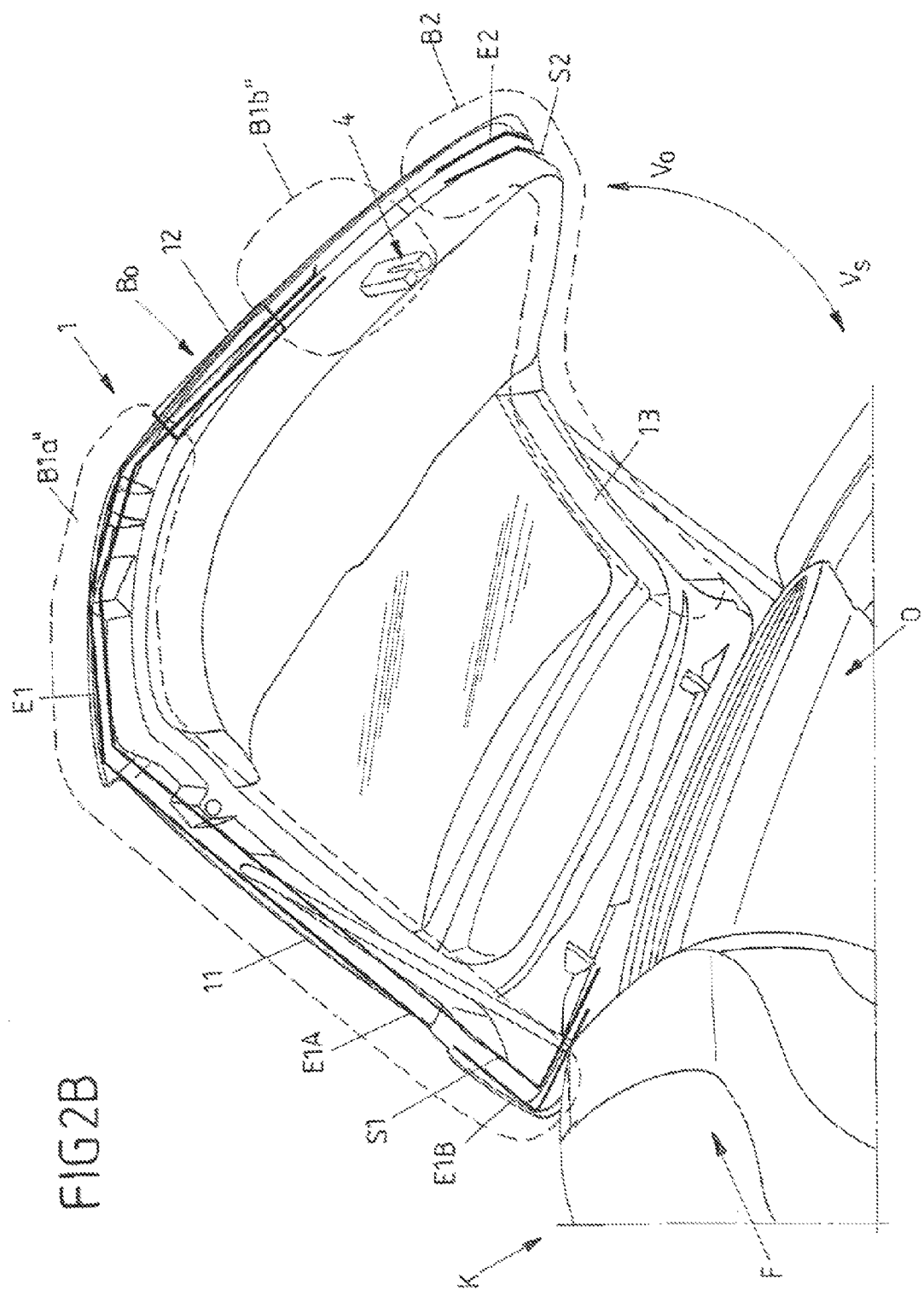

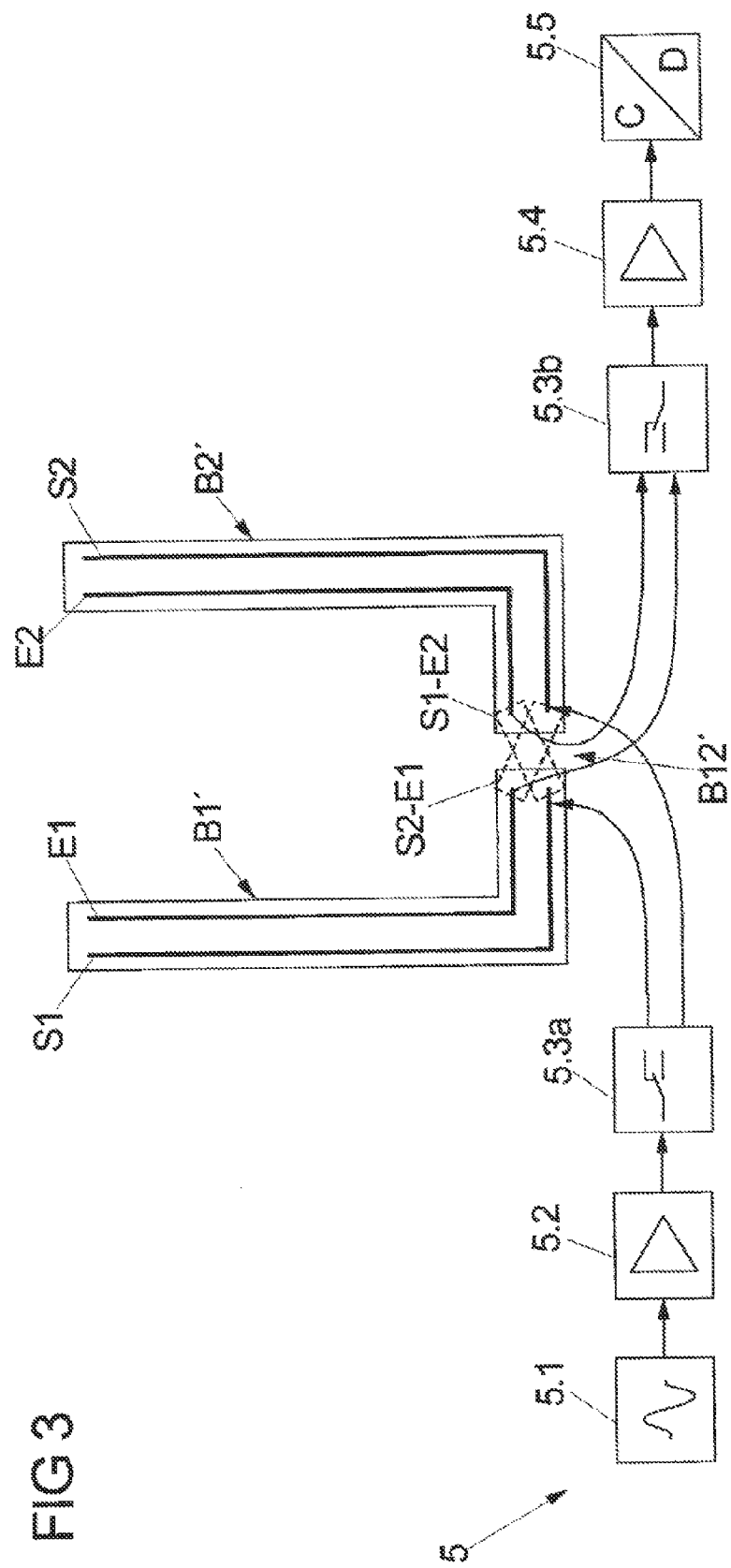

METHOD FOR CONTROLLING AN ADJUSTING MOVEMENT OF A VEHICLE CLOSING ELEMENT WITH COLLISION AVOIDANCE FOR A LOCK REGION AND ANTI-TRAP SYSTEM

CROSS-REFERENCE TO A RELATED APPLICATION

This application is a National Phase Patent Application of International Patent Application Number PCT/EP2013/002303, filed on Aug. 2, 2013, which claims priority of German Patent Application Number 10 2012 107 116.2, filed on Aug. 2, 2012.

BACKGROUND

The present invention relates to a method for controlling an adjusting movement of a vehicle closing element to be closed in a manner actuated by an external force and also to a capacitive anti-trap system.

With vehicle closing elements that can be adjusted increasingly in a manner actuated by an external force, in particular in a motor-driven manner, there is a considerable risk as the respective vehicle closing element closes that, for example, a body part of a person standing close to the vehicle will be trapped, which may lead to considerable injuries. A vehicle closing element of this type may be, for example, a side door, a tailgate lid, a window pane, or a sunroof of a motor vehicle.

By way of example, US 2007/0035156 A1 describes an anti-trap system in which two electrode arrangements each having a transmitter electrode and a receiver electrode are provided on mutually opposed longitudinal-side closing edges of a vehicle tailgate lid. The individual electrode pairs each define a monitoring region on a closing edge of the tailgate lid, in which an obstacle in the path of adjustment of the closing tailgate lid can be detected. Here, the two electrode pairs are each activated and evaluated separately. An electronic evaluation unit of the anti-trap system of US 2007/0035156 A1 thus always receives at least two signals, on the basis of which the electronic evaluation unit can determine the presence of an obstacle in one or other of the monitoring regions.

With capacitive anti-trap systems on vehicles, in particular on motor vehicles, known per se to a large extent, an obstacle in the path of adjustment of a vehicle closing element to be closed in a motor-driven manner is detected contactlessly by a changing electric capacitance and prevents an obstacle from being trapped between the closing vehicle closing element and a vehicle structure in the region of a body opening that is to be closed by the vehicle closing element in a closed position. Compared with purely tactile anti-trap systems, anti-trap systems with capacitive detection provide the advantage that a potential obstacle can be determined already before contact with the vehicle closing element or already shortly thereafter without having to exert a specific force on the sensors of the anti-trap system in order to trigger the system and stop and/or reverse the adjusting movement of the vehicle closing element.

With capacitive anti-trap systems that form the basis of the present invention, use is made of the fact that, in an electrode arrangement of the anti-trap system consisting of at least one transmitter electrode and one receiver electrode, a signal characteristic for the presence of an obstacle can be received at the receiver electrode when the transmitter electrode is activated with electric alternating current. By activating the transmitter electrode with alternating current, an electric field is produced, which is influenced by an obstacle in such a way that an electric capacitance is changed in a manner that can be measured. This measurable change of the electric capacitance can be measured at the receiver electrode, which is arranged at a distance from the transmitter electrode, and can be evaluated on the basis of a signal received by the receiver electrode, usually a voltage signal, in order to trigger the anti-trap system and in order to influence the adjusting movement of the vehicle closing element.

The adjustment of a vehicle closing element actuated by an external force not only poses an increased risk of injury by a possible entrapment. There is generally also a considerable injury risk by a locking part provided on a vehicle closing element, such as a lock. Locking parts of this type, by means of which the vehicle closing element is locked to the vehicle structure in the closed position, protrude in part on the vehicle closing element by a number of centimeters, such that collision of the locking part specifically and a person during adjustment of the vehicle closing element is likely. In addition, such locking parts are usually very heavy and are made largely from metal, such that a collision is thus particularly painful for a person.

SUMMARY

An object of the present invention is therefore to further improve a capacitive anti-trap system of the type mentioned in the introduction and in particular to minimize the risk of injury for a person by collision with a locking part, such as a door lock or a tailgate lid lock, provided on the vehicle closing element.

The method for controlling an adjusting movement of a vehicle closing element to be closed in a manner actuated by an external force as described herein is characterized in that, by means of a capacitive anti-trap system, an obstacle in a monitoring region around a locking part provided on the vehicle closing element is also detected in order to prevent a collision of this locking part with an obstacle as the vehicle closing element closes. If an obstacle is detected in the monitoring region around the locking part, an adjusting movement of the vehicle closing element is stopped and/or reversed in order to avoid the collision with the obstacle.

Due to the development according to the invention of a control method, not only is a situation of entrapment determined contactlessly by means of an anti-trap system, but also an imminent collision in the region of a locking part, such as a door lock, a luggage compartment lock or a tailgate lid lock. Due to the method according to the invention, protection against entrapment is thus combined with protection against collision in order to avoid selectively injuries caused by the locking part when closing and possibly also when opening the vehicle closing element. There is thus generally an increased risk of injury posed by a locking part on a vehicle closing element, since this locking part generally protrudes on the vehicle closing element and is comparatively heavy in order to provide a reliable locking to the vehicle structure.

Especially in the case of a vehicle closing element in the form of a motor vehicle tailgate lid, a considerable part of a tailgate lid lock often protrudes on the lower closing edge of the tailgate lid. As a result, it may be possible in principle for this (locking) part to collide with a person, in particular in the region of the head, when the tailgate lid is adjusted from an open position in the direction of a shut or closed position. By extending a capacitive anti-trap system with protection against collision so as to be able to detect a person in the path of adjustment of the vehicle closing element as an obstacle, the risk of injury is considerably reduced.

As also when detecting a situation of entrapment, the adjusting movement of the vehicle closing element is influenced by the anti-trap system in the case of an imminent collision as well, and the adjusting movement is preferably stopped and/or reversed. The evaluation as to whether a situation of entrapment is present and whether a collision of the locking part with an obstacle is imminent is preferably implemented by means of an electronic evaluation unit of the anti-trap system. This electronic evaluation unit has an evaluation logic suitable for evaluating received measurement signals and for example is integrated in a control apparatus.

For the capacitive detection of a situation of entrapment, an anti-trap system preferably has at least one transmitter electrode and one receiver electrode on the vehicle closing element, wherein, by activating the transmitter electrode with electric alternating current, an electric field is produced, which is influenced by an obstacle in such a way that an electric capacitance is changed in a manner that can be measured. A signal received via an electronic evaluation unit can then be evaluated via an electronic evaluation unit of the anti-trap system in terms of whether an electric capacitance has changed by an obstacle in the path of adjustment of the vehicle closing element and whether the adjusting movement of the vehicle closing element at least is to be stopped accordingly.

Since the evaluation of capacitively functioning sensors in the automotive field in the meantime has proven to be very easily handled technically and the detection of obstacles by a changing electric capacitance has proven to be extremely effective and reliable, it is also preferred in one variant for a change of an electric capacitance to be evaluated for the detection of an obstacle in the monitoring region for the locking part. Here, at least one receiver electrode and/or at least one transmitter electrode can be provided for the detection of an obstacle.

In this context, just one receiver electrode for example may also be provided additionally on the vehicle closing element in the region of the locking part, such that an additional signal can also be evaluated in order to determine the presence of a possible obstacle. It would be conceivable accordingly for a single transmitter electrode to be combined with at least two receiver electrodes, wherein one receiver electrode is provided for determining a situation of entrapment and another receiver electrode is provided for collision avoidance selectively in the region of the locking part.

Alternatively or additionally, for protection against collision, a dedicated, additional electrode pair consisting of at least one transmitter electrode and at least one receiver electrode can be arranged on the vehicle closing element in the region of the locking part in order to produce an electric field in the region of the locking part and so as to be able to measure an electric capacitance changing on account of an obstacle.

The electrodes provided in the region of a locking part are preferably arranged within a housing or a cover of the locking part. Here, at least one electrode for example may be embedded in such a housing or such a cover made of plastic, in particular cast therein or laid therein, for example by bonding.

In accordance with one variant, at least one transmitter electrode and an associated receiver electrode of the capacitive anti-trap system each extend over at least a part of two closing edges of the vehicle closing element in such a way that both a situation of entrapment at least at one of the closing edges and an imminent collision of the locking part with an obstacle can be detected hereby on the basis of an electric capacitance changing on account of an obstacle. A closing edge of the vehicle closing element is constituted by the portions at an outer edge of the vehicle closing element via which the vehicle closing element rests on the vehicle structure in the fully shut position or closed position of said vehicle closing element. Consequently, an obstacle between the vehicle structure and the vehicle closing element would be trapped precisely at such a closing edge if the anti-trap system were to function incorrectly and the adjusting movement of the vehicle closing element were not stopped and/or reversed. In the proposed variant, the electrodes of an electrode pair for the detection of a situation of entrapment are also used to monitor selectively a monitoring region around the locking part, that is to say for example to monitor a tailgate lid lock, in order to avoid a possible collision of the locking part with an obstacle. To this end, one of the electrodes, preferably both electrodes, can be arranged on the vehicle closing element in such a way for example that said electrode or electrodes extends/extend as far as or even beyond a portion on which the locking part is located. Here, an electrode can extend over a number of different closing edges (at least two) running at an angle relative to one another, that is to say, for example on a motor vehicle tailgate lid, both over a lateral, longitudinally running closing edge and over a lower, transversely running closing edge, on which a part of the tailgate lid lock or even the complete tailgate lid lock is usually arranged.

In one variant the capacitive anti-trap system has at least one first and one second electrode pair, which are each designed and intended to produce an electric field in a monitoring region and also to determine an electric capacitance changing on account of an obstacle. The two electrode pairs, however, are also arranged and interconnected here such that a capacitance change can be detected by means of the two electrode pairs not only in the two respective monitoring regions, but also in a third monitoring region, which is different from the two (first and second) monitoring regions and in which the locking part is located. Here, an interconnection of the two electrode pairs is understood in particular to mean that a first transmitter electrode of a first electrode pair is activated and evaluated not only with a first receiver electrode of the same electrode pair, but also together with a second receiver electrode of the second electrode pair. Thus, at least three different physical monitoring regions, which for example can be evaluated selectively in succession by appropriate activation of the electrodes, can be defined by two electrode pairs in order to determine a capacitance change on account of an obstacle in the respective monitoring region.

By way of example, a transmitter electrode of a first electrode pair and a receiver electrode of a second electrode pair and also a transmitter electrode of the second electrode pair and a receiver electrode of the first electrode pair can be interconnected in succession (crosswise) in order to be able to detect an obstacle in the additional third monitoring region, in which the locking part is arranged on the vehicle closing element. A connection of two electrode pairs can be controlled for example by means of a time multiplexer. An electronic evaluation unit of the anti-trap system can thus evaluate signals successively in a predefined order, said signals being representative of the respective monitoring region and forming the basis for detection of a capacitance change. Such a signal, for example, is a voltage signal that can be measured at each receiver electrode and that changes on account of an obstacle and the accompanying capacitance change.

A connection of at least two electrode pairs such that they additionally cover a third monitoring region, in which the locking part is located, has the advantage that on the one hand no additional electrode has to be provided in the region of the locking part and on the other hand the sensitivity to interference is reduced. The problem that detection of a capacitive obstacle in the region of a metal locking part is not readily possible may thus be addressed. On the one hand there is a greater basic capacitance and on the other hand possibly a considerable influencing of the electric field. If at least one transmitter electrode and at least one receiver electrode are now interconnected and extend along the vehicle closing element preferably on different sides of the locking part, but not on the locking part itself, these disadvantages at the least can be minimized, and a reliable collision monitoring for the locking part can be provided without having to provide additional electrodes for this purpose.

Both electrode pairs preferably extend at a distance from one another on different sides of the locking part, such that the locking part is located between the two electrode pairs. The third monitoring region produced by the connection of the two electrode pairs thus extends substantially between the two electrode pairs, preferably between the free ends of the elongate electrodes of the electrode pairs.

A further aspect of the present invention concerns the provision of a capacitive anti-trap system as described herein.

By means of this anti-trap system, an obstacle in the path of adjustment of a vehicle closing element to be closed in a manner actuated by an external force can be detected in order to prevent an obstacle from being trapped between the closing vehicle closing element and a vehicle structure in the region of a body opening that is closed by the vehicle closing element in a closed position. Here, a capacitive anti-trap system comprises at least the following:

- at least one electrode pair comprising a transmitter electrode and a receiver electrode, wherein an electric field is produced by activating the transmitter electrode with electric alternating current and is influenced by an obstacle in such a way that an electric capacitance is changed in a manner that can be measured, and
- an electronic evaluation unit, by means of which a signal received via a receiver electrode can be evaluated in terms of whether an electric capacitance has changed on account of an obstacle in the path of displacement of the vehicle closing element, such that an adjusting movement of the vehicle closing element has to be changed, in particular stopped and/or reversed.

In addition to this function, which is known per se, of a capacitive anti-trap system, an anti-trap system according to the invention is also designed and intended to detect an obstacle in a monitoring region around a locking part on the vehicle closing element in order to prevent a collision of this locking part with an obstacle, for example the head of a person, at least as said vehicle closing element closes.

A capacitive anti-trap system according to the invention is thus suitable in particular for carrying out a method according to the invention. The advantages and features explained in conjunction with a method according to the invention consequently apply also to an anti-trap system according to the invention, and vice versa.

Means for being able to detect an obstacle in a monitoring region around the locking part, for example a lock, are thus provided on an anti-trap system according to the invention, such that protection against collision functioning independently of the presence of a situation of entrapment is provided by the anti-trap system.

Here, by way of example and as already explained above, at least one electrode pair can be formed such that, in addition to detection of a situation of entrapment, an obstacle in a monitoring region around the locking part can also be detected by said electrode pair. An alternative variant can be provided here, in accordance with which an additional electrode pair is provided for the collision avoidance in the region of the locking part, whereas at least one further electrode pair is designed and provided (exclusively) for the detection of a situation of entrapment.

Alternatively or additionally, two electrode pairs can be provided, which each, in addition to the detection of a situation of entrapment, also enable a capacitive detection of an obstacle in the region around the locking part. These electrode pairs can thus be arranged for example on the vehicle closing element such that the produced electric fields of the electrode pairs overlap and thus also cover the region around the locking part, such that an obstacle can be detected here. Alternatively, a suitable connection of two electrode pairs, preferably in the time multiplex, can be provided, by means of which an additional third monitoring region for the locking part can be evaluated by means of the two electrode pairs.

In addition, it is noted that a motor-driven adjustment of a vehicle closing element is understood to mean any adjustment actuated by an external force, that is to say in particular the adjustment by means of an electric motor, hydraulic motor and/or pneumatic motor.

BRIEF DESCRIPTION OF THE DRAWINGS

Further advantages and features of the present invention will become clear with the following description of exemplary embodiments with reference to the figures.

FIG. 1 schematically shows a variant of an anti-trap system according to the invention for a vehicle closing element in the form of a motor vehicle tailgate lid, in which an additional electrode pair is provided in the region of a locking part formed as a tailgate lid lock in order to provide additional electronic protection against collision.

FIG. 2A in a view similar to FIG. 1 shows a second variant, in which electrodes extended into the lock region are provided for the protection against collision.

FIG. 2B shows a development of the variant of FIG. 2A with a schematically illustrated shielding of an electrode pair in a sub-region of a lower closing edge.

FIG. 3 schematically shows the structure of an anti-trap system according to FIGS. 2A and 2B with a connection of two electrode pairs in the time multiplex in order to monitor the lock region selectively for the presence of an obstacle.

DETAILED DESCRIPTION

Figure 4:
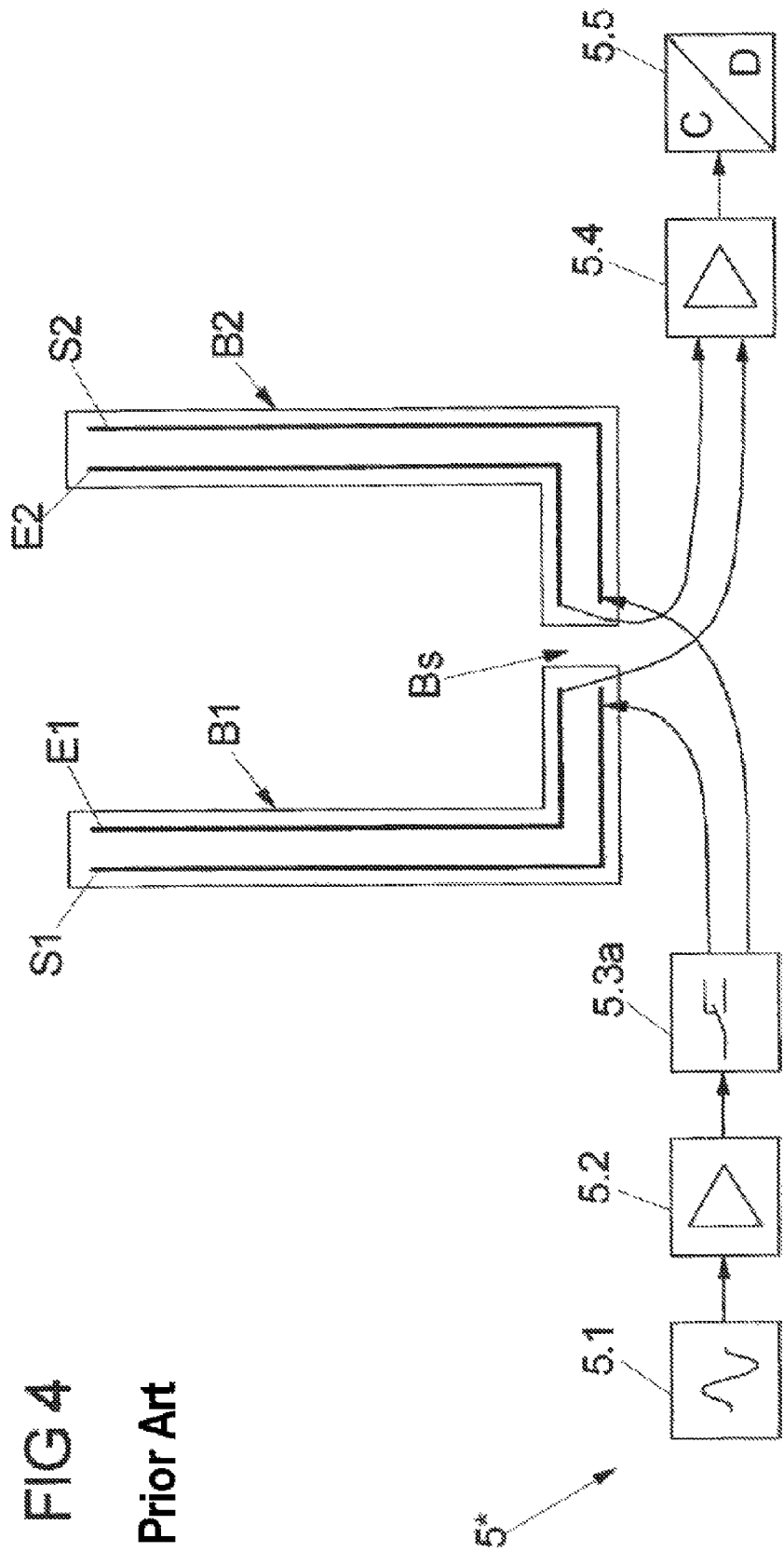
FIG. 4 in a view similar to FIG. 3 shows the structure of an anti-trap system according to the prior art.

FIG. 1 illustrates a detail of a motor vehicle K with tailgate lid 1 that can be adjusted in a motor-driven manner. Here, the tailgate lid 1, in a closed position in which the tailgate lid 1 is fully shut, closes a body opening O at the rear of the motor vehicle K, via which a loading compartment of the motor vehicle K is accessible. The tailgate lid 1 here is adjustable automatically via a drive unit 2.1, 2.2 from an opened position into a closed position along an adjustment direction $V_S$. In the present case, two drive units 2.1 and 2.2 are provided for symmetrical adjustment of the tailgate lid 1 and each engage with the tailgate lid 1 on a respective longitudinal side of the tailgate lid, that is to say to the right or left. Each of these drive units 2.1, 2.2 has a drive motor 3.1, 3.2. The two drive motors 3.1, 3.2 are controllable here via an electronic control device in order to adjust the tailgate lid 1 along the adjustment direction $V_S$ in the closed position thereof. In one variant, the drive units 2.1, 2.2 may additionally also be able, via the drive motors 3.1, 3.2 thereof, to adjust the tailgate lid 1 hinged to the body of the motor vehicle along an opposite adjustment direction $V_O$ into a hinged-out and therefore opened position.

However, it is essential in the present case that the motor vehicle K and in particular the tailgate lid 1 is equipped with a capacitive anti-trap system in order to be able to automatically stop and/or reverse an adjusting movement of the tailgate lid 1 when closing the tailgate lid 1 if an obstacle (not illustrated) is trapped between a closing edge 11, 12, 13 of the tailgate lid 1 and a vehicle structure F delimiting the body opening O. Thus, in the case of a tailgate lid 1 that can be closed in a motor-driven manner, as also in the case of other vehicle closing elements, for example in the form of window panes, side doors or sunroofs, there is the risk that in particular a body part of a person will be trapped, which may lead to considerable injuries. Here, a possible obstacle in the path of adjustment of the vehicle closing element, here the tailgate lid 1, is now to be detected contactlessly as early as possible via an anti-trap system functioning with capacitive sensor arrangement in order to prevent an entrapment of the respective obstacle. Here, such a capacitive anti-trap system of course can also be supplemented by additional sensors, which for example detect the entrapment of an obstacle in a tactile manner.

In the present case, the anti-trap system has two elongate transmitter electrodes S1, S2 and also a number of elongate receiver electrodes, of which the receiver electrodes E1, E1A, E1B and E2 can be seen in the figures. The receiver electrodes each form an electrode pair with an associated transmitter electrode, for example two electrode pairs S1, E1 and S2, E2. Neither the transmitter electrodes S1, S2 nor the receiver electrodes E1, E2 are interconnected, but in each case are arranged at a distance from one another. The two electrodes S1, S2 and E1, E2 are thus separated from one another and are physically distanced from one another.

The transmitter electrodes S1, S2 here extend predominantly over a longitudinal-side closing edge 11 or 13 and also only slightly over the transversely running closing edge 12 of the tailgate lid 1 connecting the longitudinal-side closing edges 11, 13, resting on the vehicle structure F in the region of a bumper of the motor vehicle K in the closed state, and having centrally a locking part in the form of a lock 4, provided in order to lock the tailgate lid 1. The two transmitter electrodes S1 and S2 each run practically completely along one of the longitudinal-side closing edges 11 and 13 respectively. In the present case, the receiver electrode E2 runs along the (right) closing edge 13, whereas the receiver electrodes E1, E1A, E1B run in succession along the opposite (left) closing edge 11. In particular, FIG. 1 is to illustrate here by way of example the fact that, instead of an individual continuous receiver electrode for a closing edge 11, 12, a number of receiver electrodes E1, E1A, E1B can also be combined with an individual transmitter electrode S1, for example when it is difficult to lay a continuous receiver electrode due to the installation space.

Both the transmitter electrodes S1, S2 and the receiver electrodes E1, E2 preferably run on or within the tailgate lid 1, that is to say for example below a protective plastic cover or a seal encasing one of the electrodes.

In order to be able to detect an obstacle in the path of adjustment of the tailgate lid 1 during closure and thus to effectively prevent an entrapment of the obstacle, the two transmitter electrodes S1, S2 are activated with electric alternating current. An electric field is thus produced in a monitoring region B1, B3 and is influenced by an obstacle in such a way that an electric capacitance is changed in a manner that can be measured. Here, a change of the electric capacitance can then be detected via the respective associated receiver electrode E1, E1A, E1B (for the monitoring region B1 on the closing edge 11) and E2 (for the monitoring region B3 on the closing edge B3), such that it is possible to automatically evaluate via an electronic evaluation unit 5, which is electrically connected via signal lines 50 to the receiver electrodes E1, E1A, E1B and E2, by means of an evaluation logic whether an obstacle is present in a monitoring region B1, B3 of the respective transmitter electrode S1, S2 in the path of adjustment of the tailgate lid 1.

FIG. 4 schematically shows the structure of an anti-trap system known from the prior art with an electronic evaluation unit 5*. This electronic evaluation unit 5* here comprises not only components connected to a receiver electrode E1, such as a receiver amplifier 5.4 and an evaluation circuit 5.5 (with integrated evaluation logic or with coupling to an evaluation logic), via which a voltage signal received via the receiver electrode E1 can be amplified and evaluated in order to determine the presence of an obstacle in the path of adjustment of the tailgate lid 1. Rather, components of the electronic evaluation unit 5* are also connected to the transmitter electrodes S1, S2 in the present variant. These components connected to the transmitter electrodes S1, S2 and activating the transmitter electrodes S1, S2 with electric alternating current are a signal generator 5.1, an amplifier 5.2 arranged downstream of this signal generator 5.1, and an analog multiplexer 5.3a following the amplifier 5.2.

Here, alternating current with predefined amplitude and frequency is produced via the signal generator 5.1 and is forwarded alternately over time to the transmitter electrode S1 or the transmitter electrode S2 via the amplifier 5.2 and the analog multiplexer 5.3a. As a result of the illustrated structure with an analog multiplexer 5.3a, an alternating current with predefined amplitude and frequency is transmitted selectively to the (first) transmitter electrode S1 or to the (second) transmitter electrode S2, such that it is possible to evaluate, on the basis of signals received in succession from the evaluation circuit 5.5, whether a change to the electric capacitance has occurred in the monitoring region B1 of the first transmitter electrode Si or in the monitoring region B3 of the second transmitter electrode S2, said change indicating the presence of an obstacle in the path of adjustment of the tailgate lid 1. A number of sensor channels in the time multiplex are thus measured in order to determine in a spatially resolved manner those monitoring regions B1, B3 (defined by a transmitter electrode S1, S2) on the tailgate lid 1 in which the collision with an obstacle will occur if the adjusting movement of the tailgate lid 1 is not stopped and/or reversed.

The actual evaluation is performed in each case in particular with the aid of the evaluation circuit 5.5 of the evaluation unit 5*, as also in the case of the evaluation unit 5. Here, a capacitance signal or a number of capacitance signals, which are each representative of a transmitter electrode S1, S2, is/are obtained via the evaluation circuit 5.5 from a received voltage signal, and the respective capacitance signal is converted into a digital signal, in order to thus control the stopping and/or reversal of the adjusting movement of the tailgate lid 1. Here, the evaluation unit 5, 5\* is part of a control apparatus accommodated in the motor vehicle K.

The anti-trap system with an evaluation unit 5\* according to the prior art does not provide for a monitoring at the lower, transversely running closing edge 12 comprising the lock 4. Rather, an unmonitored region $B_s$ is provided, in which the presence of an obstacle cannot be detected by the anti-trap system. Thus, the detection of a situation of entrapment focused previously on the longitudinally running lateral closing edges 11, 13; this is particularly the case since, on account of metal materials in the lock region of the lock 4 and counterpiece thereof on the motor vehicle K, a reliable detection of a situation of entrapment is not readily possible.

However, irrespectively of a situation of entrapment, there is a risk of injury by the lock 4 protruding at the lower closing edge 12 of the tailgate lid 1, since the lock 4 can easily collide with a person, for example the head of said person, as the tailgate lid 1 closes. The present invention is applicable precisely in this case and combines a capacitive anti-trap system with protection against collision for a locking part, here in the form of the lock 4, which is arranged on a vehicle closing element such as the tailgate lid 1.

In the case of the variant of FIG. 1, an additional electrode pair comprising a transmitter electrode S3 and a receiver electrode E3 is provided for this purpose in the region of the lock 4. The transmitter electrode S3 and the receiver electrode E3 here are accommodated for example in a housing or a cover of the lock 4, in particular embedded in a plastic material of the housing or of the cover. An obstacle in a monitoring region B3 around the lock 4 is detected via the electrode pair S3, E3, likewise capacitively. Here, the transmitter electrode S3 also produces an electric field in a monitoring region B3, such that a possible obstacle, for example a person, causes a capacitance change that can be measured at the receiver electrode E3.

Since the control apparatus or the evaluation unit 5 of the capacitive anti-trap system is in any case designed and intended to determine any capacitance changes on the basis of voltage signals received by the receiver electrodes E1, E1A, E1B and E2, the evaluation unit 5 can also be used readily to evaluate a voltage signal of the receiver electrode E3 for the lock region. Accordingly, an imminent collision of the lock 4 with an obstacle can be determined via the electronic evaluation unit 5 as the tailgate lid 1 closes, and the motor-driven drive units 2.1, 2.2 are prompted to stop and/or reverse the adjusting movement of the tailgate lid 1 in order to avoid the collision.

For the coupling of the additional electrode pair S3, E3, separate inputs and outputs can be provided on the evaluation unit 5. However, it is alternatively also possible to connect in parallel the transmitter electrode S3 to one of the other transmitter electrodes S1, S2, such that these are activated simultaneously with electric alternating current. These possibilities are illustrated by dashed lines in the illustration of FIG. 1.

In the variant of FIG. 2A, no additional transmitter and receiver electrodes S3, E3 are provided in order to provide protection against collision, but transmitter and receiver electrodes S1, S2, E1, E2 already provided for the detection of a situation of entrapment are used. Here, the transmitter and receiver electrodes S1, S2, E1 and E2, which extend along one of the longitudinal-side closing edges 11, 13, are each longer compared with the variant of FIG. 1, such that they also extend along the lower, transversely running closing edge 12 of the tailgate lid 1. Here, each electrode pair S1, E1 and S2, E2 runs approximately as far as the middle of the lower closing edge 12 up to a portion on the lower closing edge 12 on which the lock 4 is arranged.

Due to the extension of the electrodes S1, S2, E1, E2 into the lock region on the lower closing edge 12, a monitoring region B1' or B2' also covers the region around the lock 4 with activation of the respective transmitter electrode S1, S2, such that an obstacle in the vicinity of the lock 4 can be determined on the basis of a capacitance change. Here, the two electrode pairs S1, E1 and S2, E2 can also be arranged relative to one another such that the respective monitoring regions B1' and B2' covered thereby overlap in the region of the lock 4, such that a lock monitoring region B12' defined by the two electrode pairs S1, E1 and S2, E2 is created. This lock monitoring region B12' can also be provided by an intelligent interconnection of the two electrodes pairs S1, E1 and S2, E2, as will be explained hereinafter in greater detail in conjunction with FIG. 3.

FIG. 2B shows a further possible development of the variant of FIG. 2A. Here, a portion on the lower closing edge 12, along which the transmitter electrode S1 and the receiver electrode E1 extend, is provided in part with a shielding. Due to this shielding, a shielded region $B_0$, in which no obstacle detection is possible, is produced along the extension of the two electrodes S1, E1 of an electrode pair.

In the present case, the shielding at the lower closing edge 12 divides a monitoring region covered by the receiver electrodes E1, E1A and E1B and the transmitter electrode S1 into two monitoring sub-regions B1a" and B1b". Here, the shielding at the lower closing edge 12, the transmitter electrode S1, and the receiver electrode E1 are dimensioned and arranged such that the monitoring sub-region B1b" still covers the lock region around the lock 4. Here, in the case of the variant of FIG. 2B, merely one of the electrode pairs, specifically the electrode pair S1, E1, is extended into the lock region in order to thus additionally provide capacitively functioning protection against collision. Accordingly, merely one electrode pair is formed here such that an obstacle in the monitoring sub-region B1b" around the lock 4 thus also can be detected in order to counteract a collision of the lock 4 with a person.

Thus, a capacitive monitoring of a lock region around the lock 4 is provided with the aid of an electrode pair S1, E1 (possibly together with a further electrode pair S2, E2, as explained hereinafter) by extending the electrodes S1, E1 of this electrode pair into the lock region at the lower closing edge 12, even though a shielding is provided in a (large) part of the lower closing edge 12. By way of example, such a shielding may be advised if interfering influences would otherwise increase excessively in the region of the lower closing edge 12, for example by the vehicle structure F or components provided thereon.

Alternatively or additionally, the partly shielded electrode pair S1, E1 can be combined with an adjacent electrode pair S2, E2 according to FIG. 1, likewise extended into the lock region. Connection to the other adjacent electrode pair S2, E2 for collision detection around the lock 4 is thus possible.

A possible structure of the evaluation unit 5 in order to provide collision monitoring in the lock monitoring region B12' on account of intelligent connection of two electrode pairs S1, E1 and S2, E2 is shown with FIG. 3. This may be advantageous for example in order to avoid an increased basic capacitance and in order to make the system less susceptible to any interference.

Here, in contrast to an evaluation unit 5\* known from the prior art in accordance with FIG. 4, a second analog multiplexer 5.3b is provided on the receiver side in a variant formed in accordance with the invention in order to not only activate in the time multiplex, but also evaluate the electrode pairs S1, E1 and S2, E2. The evaluation unit 5 is thus able to connect through the individual receiver electrodes E1 and E2 in the time multiplex. By way of example, the first transmitter electrode S1 can thus be activated, and the voltage signal produced hereby at the associated first receiver electrode E1 and then the voltage signal produced at the other second receiver electrode E2 can then be evaluated in succession by connection through the analog multiplexer 5.3b between the two receiver electrodes E1 and E2. With the aid of the transmitter-side analog multiplexer 5.3a, the second transmitter electrode S2 is then activated, and the voltage signal received by the associated second receiver electrode E2 is evaluated. With the aid of the receiver-side analog multiplexer 5.3b, the voltage signal at the first receiver electrode E1 can then be evaluated with further maintained activation of the second transmitter electrode S2. Due to the resultant cross-connection of the two electrode pairs S1, E1 and S2, E2 preferably structured substantially symmetrically to one another, a region around the lock 4 is also monitored capacitively for the presence of an obstacle. The resultant lock monitoring region B12' consequently covers not only the lock 4, but also a region around the lock 4, such that a possible obstacle in the vicinity of the lock 4 can be determined on the basis of the voltage signals of the receiver electrodes E1, E2.

Although the two electrode pairs S1, E1 and S2, E2 here are not guided as far as the lock 4, but the lock 4 lies between the ends of the respective electrodes S1, E1, S2, E2, an additional monitoring of the lock region can be provided by the shown connection of the electrode pairs S1, E1 and S2, E2 arranged on different sides of the lock 4. Indeed, it would also be possible in principle to evaluate successively the receiver electrode E1 on the first (left) side with respect to the lock 4 and then the other receiver electrode E2 on the other (right) side of the lock 4 merely with activation of the individual first transmitter electrode S1 in order to also be able to determine contactlessly an imminent collision of the lock 4 with an obstacle, in particular a person, in addition to a situation of entrapment. However, due to the crosswise connection with chronologically successive activation of both transmitter electrodes and evaluation of both receiver electrodes beyond the lock 4, it is possible to determine more reliably the presence of an obstacle in the lock region.

Although each of the figures illustrates a tailgate lid 1, the present invention can also be used of course with other vehicle closing elements, such as a luggage compartment lid.

The invention claimed is:

1. A method for controlling movement of a vehicle closing element of a vehicle, the vehicle closing element configured to be moved into a closed position by an external force to close a body opening of the vehicle, wherein the vehicle closing element has a locking part for locking the vehicle closing element in the closed position, the method comprising:
    detecting an obstacle in an adjustment path of the vehicle closing element moving to the closed position by using a capacitive anti-trap system;
    controlling the movement of the vehicle closing element using the capacitive anti-trap system such that an obstacle is prevented from being trapped between the vehicle closing element and a vehicle body defining the body opening, and
    detecting an obstacle in a monitoring region around the locking part using the capacitive anti-trap system in order to prevent a collision of the locking part with the obstacle at least as the vehicle closing element moves towards the closed position,
    wherein the vehicle closing element comprises two different closing edges on the vehicle body on which each vehicle closing element rests in the closed position and wherein the locking part is located on one of the closing edges; and
    wherein at least two electrode pairs of the capacitive anti-trap system each comprise a transmitter electrode and a receiver electrode which each extend over at least a part of the two different closing edges such that an obstacle at least at one of the closing edges and an imminent collision of the locking part with the obstacle can be detected due to an electric capacitance of the electrode pair changing on account of the obstacle.

2. The method as claimed in claim 1, wherein detecting an obstacle in the monitoring region comprises evaluating a change of an electric capacitance.

3. The method as claimed in claim 2, wherein both the detecting of an obstacle in the adjustment path of the vehicle closing element and the detecting of an obstacle in the monitoring region around the locking part are performed by means of an electronic evaluator of the capacitive anti-trap system, the electronic evaluator having an evaluation logic suitable for evaluating received measurement signals.

4. The method as claimed in claim 1, wherein at least one transmitter electrode and an associated receiver electrode of the capacitive anti-trap system each extend over at least a part of the two closing edges such that an obstacle in the adjustment path of the vehicle closing element at least at one of the closing edges and an imminent collision of the locking part with an obstacle in the monitoring region around the locking part can be detected by an electric capacitance changing on account of the obstacle.

5. A method for controlling movement of a vehicle closing element of a vehicle, the vehicle closing element configured to be moved into a closed position by an external force to close a body opening of the vehicle, wherein the vehicle closing element has a locking part for locking the vehicle closing element in the closed position, the method comprising:
    detecting an obstacle in an adjustment path of the vehicle closing element moving to the closed position by using a capacitive anti-trap system;
    controlling the movement of the vehicle closing element using the capacitive anti-trap system such that an obstacle is prevented from being trapped between the vehicle closing element and a vehicle body defining the body opening, and
    detecting an obstacle in a monitoring region around the locking part using the capacitive anti-trap system in order to prevent a collision of the locking part with the obstacle at least as the vehicle closing element moves towards the closed position, wherein the capacitive anti-trap system has a first and a second electrode pair, wherein
    the first electrode pair comprises a first transmitter electrode and a first receiver electrode to produce a first electric field in a first monitoring region,
    the second electrode pair comprises a second transmitter electrode and a second receiver electrode to produce a second electric field in a second monitoring region, and
    the two electrode pairs are arranged and interconnected such that, via the electrode pairs, a capacitance change on account of an obstacle can be detected in a third monitoring region, which is different from the first and second monitoring regions and in which the locking part is located.

6. The method as claimed in claim 5, wherein the two electrode pairs are spaced from one another on different sides of the locking part and wherein the third monitoring region extends substantially between the two electrode pairs.

7. The method as claimed in claim 5, wherein the first transmitter electrode and the second receiver electrode and/or the second transmitter electrode and the first receiver electrode are interconnected in order to be able to detect an obstacle in the third monitoring region.

8. The method as claimed in claim 7, wherein the first transmitter electrode and the second receiver electrode and the second transmitter electrode and the first receiver electrode are interconnected in succession in order to be able to detect an obstacle in the third monitoring region.

9. The method as claimed in claim 5, wherein at least one signal representative of the first monitoring region, at least one signal representative of the second monitoring region and at least one signal representative of the third monitoring region are evaluated in succession in a predefined order via an electronic evaluator of the capacitive anti-trap system.

10. The method as claimed in claim 5, wherein the interconnection of the electrode pairs is controlled by a time multiplexer.

11. A capacitive anti-trap system for a vehicle, the capacitive anti-trap system being configured to detect an obstacle in an adjustment path of a vehicle closing element moving to a closed position by an external force and to prevent the obstacle from being trapped between the closing vehicle closing element and a vehicle body defining a body opening that is configured to be closed by the vehicle closing element in the closed position and being configured to detect an object in a monitoring region around a locking part on the vehicle closing element in order to prevent a collision of the locking part with the object at least as the vehicle closing element closes, wherein the vehicle closing element has at least two different closing edges, via each of which the vehicle closing element rests in the closed position thereof on the vehicle structure, and the locking part is provided on one of the closing edges, each of the electrode pairs extending over at least a part of the two different closing edges such that both an obstacle in the adjustment path of the vehicle closing element and an imminent collision of the locking part with an obstacle can be detected by each electrode pair based on a changed electrical capacitance caused by the obstacle, the capacitive anti-trap system comprising:
at least two electrode pairs each comprising a transmitter electrode and a receiver electrode, wherein the at least one electrode pair is configured to produce an electric field by activating the transmitter electrode with electric alternating current and is configured to be influenced by an obstacle in such a way that an electric capacitance is measurably changed; and
an electronic evaluator having an evaluation logic by which a signal received via a receiver electrode can be evaluated to determine whether the electric capacitance has changed on account of the obstacle in an adjustment path of the vehicle closing element.

12. A capacitive anti-trap system for a vehicle, the capacitive anti-trap system being configured to detect an obstacle in an adjustment path of a vehicle closing element moving to a closed position by an external force and to prevent the obstacle from being trapped between the closing vehicle closing element and a vehicle body defining a body opening that is configured to be closed by the vehicle closing element in the closed position and being configured to detect an object in a monitoring region around a locking part on the vehicle closing element in order to prevent a collision of the locking part with the object at least as the vehicle closing element closes, wherein the vehicle closing element has at least two different closing edges, via each of which the vehicle closing element rests in the closed position thereof on the vehicle structure, and the locking part is provided on one of the closing edges, each of the electrode pairs extending over at least a part of the two different closing edges such that both an obstacle in the adjustment path of the vehicle closing element and an imminent collision of the locking part with an obstacle can be detected by each electrode pair based on a changed electrical capacitance caused by the obstacle, the capacitive anti-trap system comprising:
at least two electrode pairs each comprising a transmitter electrode and a receiver electrode, wherein the at least one electrode pair is configured to produce an electric field by activating the transmitter electrode with electric alternating current and is configured to be influenced by an obstacle in such a way that an electric capacitance is measurably changed; and
an electronic evaluator having an evaluation logic by which a signal received via a receiver electrode can be evaluated to determine whether the electric capacitance has changed on account of the obstacle in an adjustment path of the vehicle closing element,
wherein the at least two electrode pairs comprise a first and a second electrode pair, wherein
the first electrode pair comprises a first transmitter electrode and a first receiver electrode configured to produce a first electric field in a first monitoring region,
the second electrode pair comprises a second transmitter electrode and a second receiver electrode configured to produce an electric field in a second monitoring region, and
the at least two electrode pairs are arranged and interconnected such that, via the electrode pairs, a capacitance change on account of an obstacle can be detected in a third monitoring region, which is different from the first and second monitoring regions and in which the locking part is located.

13. The method as claimed in claim 1, wherein the at least one transmitter electrode or the at least one receiver electrode is arranged on the vehicle closing element within a housing or a cover of the locking part.

14. The method as claimed in claim 6, wherein the two electrode pairs are arranged at a distance from one another on different sides of the locking part and the third monitoring region extends substantially between two ends of the electrodes of the electrode pairs.

* * * * *

UNITED STATES PATENT AND TRADEMARK OFFICE
CERTIFICATE OF CORRECTION

PATENT NO. : 9,476,243 B2  Page 1 of 1
APPLICATION NO. : 14/418893
DATED : October 25, 2016
INVENTOR(S) : Holger Wuerstlein et al.

It is certified that error appears in the above-identified patent and that said Letters Patent is hereby corrected as shown below:

In the Claims

Column 11, Line 65,    Insert --the--,
Claim 1                Before "body opening,"

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*